United States Patent [19]
Adachi et al.

[11] Patent Number: 4,800,289
[45] Date of Patent: Jan. 24, 1989

[54] ANTI-SKID APPARATUS FOR AUTOMOTIVE VEHICLE

[75] Inventors: Yoshiharu Adachi, Gamagori; Takumi Nishimura, Chiryu; Hiroaki Takeuchi, Toyota; Noboru Noguchi, Toyota; Nobuyasu Nakanishi, Toyota; Hiromu Kuromitsu, Kariya, all of Japan

[73] Assignees: Aisin Seiki Kabushiki Kaisha, Kariya; Toyota Jidosha Kabushiki Kaisha, Toyota, both of Japan

[21] Appl. No.: 4,707

[22] Filed: Jan. 20, 1987

[30] Foreign Application Priority Data

Dec. 22, 1986 [JP] Japan .................... 61-306026

[51] Int. Cl.$^4$ ................................. B60T 8/40
[52] U.S. Cl. ........................ 303/119; 303/116
[58] Field of Search ................ 188/181 A; 303/103, 303/105, 110, 113–116, 119, 92

[56] References Cited

U.S. PATENT DOCUMENTS

| | | | |
|---|---|---|---|
| 4,346,943 | 8/1982 | Leiber | 303/119 |
| 4,557,528 | 12/1985 | Leiber | 303/119 X |
| 4,643,486 | 2/1987 | Belart et al. | 303/119 X |

FOREIGN PATENT DOCUMENTS 56-10219 3/1981 Japan .

Primary Examiner—Duane A. Reger
Attorney, Agent, or Firm—Oblon, Fisher, Spivak, McClelland & Maier

[57] ABSTRACT

An anti-skid apparatus for installation in a vehicle braking system between a master cylinder and a wheel brake cylinder. The anti-skid apparatus includes a hydraulic power pressure source connected to a fluid reservoir of the master cylinder to produce a hydraulic power pressure higher than a braking pressure applied to the wheel brake cylinder from the master cylinder, a regulator valve connected to the pressure source to control the power pressure in dependence upon a hydraulic pressure created in the master cylinder in braking operation, a first switchover valve disposed within a braking circuit connecting the master cylinder to the wheel brake cylinder and being arranged to be intermittently activated when a road wheel tends to be locked, the first switchover valve being connected to the reservoir to connect the wheel brake cylinder to the reservoir in its activated condition, a second switchover valve disposed within the braking circuit between the master cylinder and the first switchover valve and being arranged to be activated when the road wheel tends to be locked, a second switchover valve being connected to the regulator valve to interrupt the flow of pressurized fluid from the master cylinder and permit the flow of pressurized fluid from the regulator valve to the wheel brake cylinder through the first switchover valve.

12 Claims, 5 Drawing Sheets

4,800,289

ANTI-SKID APPARATUS FOR AUTOMOTIVE VEHICLE

BACKGROUND OF THE INVENTION

1. Field of the Invention

The present invention relates to an anti-skid apparatus for installation in a vehicle braking system to prevent the road wheels of the vehicle from locking in braking operation, and more particularly to an anti-skid apparatus wherein an electrically operated switchover valve is disposed within each braking circuit connecting a master cylinder to wheel brake cylinders to intermittently connect the wheel brake cylinders to a fluid reservoir of the master cylinder in response to a control signal applied thereto from an electric control circuit when the road wheels tend to be locked.

2. Description of the Prior Art

In Japanese patent publication No. 56-10219, there has been proposed such an anti-skid apparatus as described above wherein the master cylinder is arranged to be power-assisted by a hydraulic brake booster and wherein an electrically operated cut-off valve is disposed within the braking circuit between the master cylinder and the switchover value to interrupt the fluid under pressure from the master cylinder when activated in response to the control signal from the electric control circuit, and a check valve is disposed within a fluid circuit connecting the brake booster to the braking circuit between the cut-off valve and the switchover valve to permit the fluid under pressure supplied from the brake booster to the wheel brake cylinders therethrough during activation of the cut-off valve. In the anti-skid apparatus, it is advantageous that during activation of the cut-off valve the hydraulic fluid in the pressure chamber of the master cylinder remains without causing any consumption thereof to eliminate useless depression stroke of the brake pedal. However, the intermittent supply of the pressurized fluid from the brake booster causes fluctuation in power assist to the master cylinder, resulting in unpleasant shock on the brake pedal.

SUMMARY OF THE INVENTION

It is, therefore, a primary object of the present invention to provide an improved anti-skid apparatus wherein the wheel brake cylinders are intermittently supplied with fluid under pressure from a hydraulic power pressure source in response to the control signal from the electric control circuit to eliminate such fluctuation in operation of the master cylinder as described above.

Another object of the present invention is to provide an improved anti-skid apparatus, having the above-mentioned characteristics, wherein a regulator valve is arranged to control the hydraulic pressure applied to the wheel brake cylinders from the power pressure source in accordance with the master cylinder pressure.

According to the present invention, the objects are attained by providing an anti-skid apparatus for installation in a vehicle braking system between a master cylinder and a wheel brake cylinder, which apparatus comprises a fluid reservoir arranged to store an amount of hydraulic fluid, a hydraulic power pressure source connected to the fluid reservoir to produce a hydraulic power pressure higher than a braking pressure applied to the wheel brake cylinder from the master cylinder, a regulator valve connected to the power pressure source to control the hydraulic power pressure in dependence upon a hydraulic pressure created in the master cylinder in braking operation, a first switchover valve disposed within a braking circuit connecting the master cylinder to the wheel brake cylinder and being arranged to be intermittently activated when a road wheel tends to be locked in braking operation, the first switchover valve being connected to the fluid reservoir to connect the wheel brake cylinder to the fluid reservoir in its activated condition, a second switchover valve disposed within the braking circuit between the master cylinder and the first switchover valve and being arranged to be activated when the road wheel tends to be locked, the second switchover valve being connected to the regulator valve to interrupt the flow of fluid under pressure from the master cylinder and permit the flow of fluid under pressure supplied from the regulator valve to the wheel brake cylinder through the first switchover valve in its activated condition and to permit the flow of fluid under pressure supplied to the wheel brake cylinder from the master cylinder in its deactivated condition.

In a practical embodiment of the present invention, it is preferably that the fluid reservoir is in the form of a fluid reservoir of the master cylinder. In the case that the master cylinder is equipped with a hydraulic brake booster to be activated by depression of a brake pedal, the brake booster is connected to the power pressure source, and the regulator valve is connected to the brake booster to control the hydraulic power pressure in dependence upon a hydraulic assist power of the brake booster applied to the master cylinder in braking operation. Alternatively, the regulator valve may be connected to the braking circuit between the master cylinder and the second switchover valve to control the hydraulic power pressure in dependence upon a braking pressure applied to the wheel brake cylinder from the master cylinder in braking operation.

Furthermore, in another practical embodiment of the present invention, the second switchover valve may be replaced with a cut-off valve disposed within the braking circuit between the master cylinder and the first switchover valve and being arranged to be activated when the road wheel tends to be locked. In such a case, the cut-off valve is arranged to interrupt the flow of fluid under pressure from the master cylinder in its activated condition and to permit the flow of fluid under pressure supplied from the master cylinder to the wheel brake cylinder through the first switchover valve in its deactivated condition, and a check valve is disposed within a fluid circuit connecting the regulator valve to the braking circuit between the cut-off valve and the first switchover valve to permit the flow of fluid under pressure from the regulator valve to the switchover valve.

BRIEF DESCRIPTION OF THE DRAWINGS

Additional objects, features and advantages of the present invention will become more readily apparent from the following detailed description of preferred embodiments thereof when considered with reference to the accompanying drawings, in which.

DESCRIPTION OF THE PREFERRED EMBODIMENTS

Figure 1:
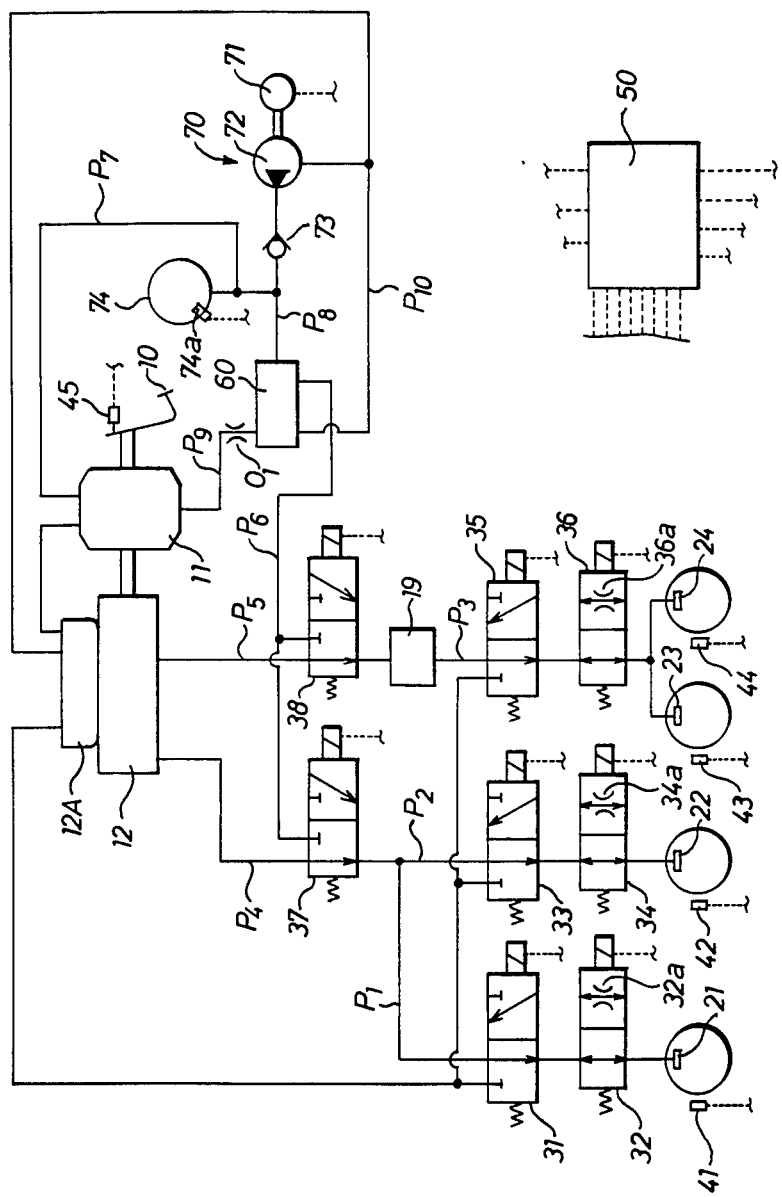
FIG. 1 is a schematic illustration of an anti-skid apparatus for installation in a vehicle braking system.

In FIG. 1 of the drawings, there is schematically illustrated a braking system for automotive vehicles which includes a tandem master cylinder 12 equipped with a hydraulic brake booster 11 to be activated by depression of a brake pedal 10. The tandem master cylinder 12 has a front pressure chamber connected to a left-hand front wheel brake cylinder 21 by way of conduits $P_1$ and $P_4$ and to a right-hand front wheel brake cylinder 22 by way of conduits $P_2$ and $P_4$ and has a rear pressure chamber connected to rear wheel brake cylinders 23 and 24 by way of conduits $P_3$ and $P_5$. Disposed within the conduit $P_3$ is a well-known proportioning valve 19.

An anti-skid apparatus for the braking system is arranged to independently control each hydraulic pressure applied to the wheel brake cylinders 21, 22, 23 and 24 when the road wheels tend to be locked in braking operation of the vehicle. The anti-skid apparatus includes electrically operated switchover valves 31, 33 and 35 each disposed within the conduits $P_1$, $P_2$ and $P_3$, electrically operated flow control valves 32, 34 and 36 each disposed within the conduits $P_1$, $P_2$ and $P_3$, and wheel lock sensors 41, 42, 43 and 44 arranged to produce electric signals indicative of each rotational speed of the front and rear road wheels. The anti-skid apparatus further includes a normally open brake switch 45 arranged to be closed by depression of the brake pedal 10, and a microcomputer 50 connected to the brake switch 45 to be activated in response to closing of the brake switch 45 and being connected to the sensors 41-44 to detect each lock condition of the road wheels in dependence upon each value of the electric signals from sensors 41-44 so as to produce control signals therefrom when the road wheels tend to be locked in braking operation of the vehicle. The anti-skid apparatus further includes electrically operated switchover valves 37 and 38 each disposed within the conduits $P_4$ and $P_5$, a regulator valve 60 connected to the switchover valves 37, 38 by way of a conduit $P_6$, and a hydraulic power pressure source 70 connected to the brake booster 11 and regulator valve 60 by way of conduits $P_7$ and $P_8$.

The switchover valves 31, 33 and 35 are arranged to connect the wheel brake cylinders 21-24 to the switchover valves 37, 38 therethrough in their deenergized condition and to connect the wheel brake cylinders 21-24 to a fluid reservoir 12A of master cylinder 12 therethrough in their energized condition. The flow control valves 32, 34 and 36 are arranged to permit the flow of fluid under pressure between the wheel brake cylinders 21-24 and the switchover valves 31, 33 and 35 therethrough in their deenergized condition without causing any throttling effect to the fluid flow. The flow control valves 32, 34 and 36 are provided with throttles $32a$, $34a$ and $36a$ which are arranged to throttle the flow of fluid under pressure passing therethrough when the flow control valves are energized. The switchover valves 37 and 38 are arranged to connect the conduits $P_1$, $P_2$ and $P_3$ to the conduits $P_4$ and $P_5$ and disconnect the conduit $P_6$ from them in their deenergized condition thereby to permit the flow of fluid under pressure supplied to the switchover valves 31, 33 and 35 from the master cylinder 12 therethrough. The switchover valves 37 and 38 are further arranged to connect the conduits $P_1$, $P_2$ and $P_3$ to the conduit $P_6$ and disconnect the conduits $P_4$ and $P_5$ from them in their energized condition thereby to permit the flow of fluid under pressure supplied to the switchover valves 31, 33 and 35 from the regulator valve 60 therethrough.

In this embodiment, the switchover valves 31, 33, 35 and flow control valves 32, 34 and 36 are connected to the computer 50 to be intermittently energized in response to one of the control signals from the computer 50. The switchover valves 37 and 38 are also connected to the computer 50 to be energized in response to the one of the control signals from the computer 50. Preferably, the switchover valves 37 and 38 are arranged to be energized prior to energization of the valves 31-36 when applied with the other control signal from the computer 50. Thus, the switchover valves 31, 33 and 35 are supplied with the fluid under pressure from the master cylinder 12 when the switchover valves 37 and 38 are being deenergized in braking operation and are supplied with the fluid under pressure from the regulator valve 60 when the switchover valves 37 and 38 are energized in braking operation.

The regulator valve 60 is connected to the hydraulic brake booster 11 by way of a conduit $P_9$ to be supplied with the fluid under pressure from the brake booster 11 through a throttle $0_1$ in braking operation. In this embodiment, the hydraulic pressure applied to the regulator valve 60 from the brake booster 11 corresponds with the assist power applied to the master cylinder 12 in braking operation. Thus, the regulator valve 60 acts to control the hydraulic power pressure applied thereto from the power pressure source 70 through the conduit $P_8$ in dependence upon the hydraulic pressure from the brake booster 11 thereby to modulate the power pressure approximately to the same value as the master cylinder pressure.

Figure 2:
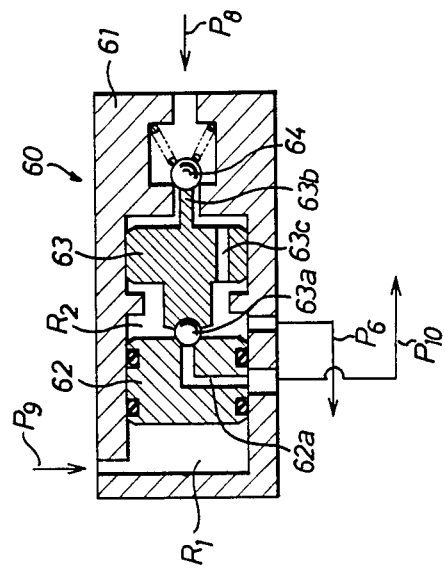
FIG. 2 is a sectional view of a regulator valve shown in FIG. 1.

As shown in FIG. 2, the regulator valve 60 includes a housing 61 formed with four ports for connection to the conduits $P_6$, $P_8$, $P_9$ and a return conduit $P_{10}$ and being provided therein with a piston 62, a valve member 63 and a check valve 64. The piston 62 is axially movably disposed within the housing 61 to subdivide the interior of housing 61 into fluid chambers $R_1$ and $R_2$ respectively connected to the conduits $P_9$ and $P_6$. The piston 62 is formed with a passage $62a$ for permitting the flow of fluid passing therethrough from the fluid chamber $R_2$ to the return conduit $P_{10}$ in connection to the fluid reservoir 12A of master cylinder 12. The valve member 63 is provided with a ball $63a$ fixed thereto for closing and opening the passage $62a$ of piston 62 and with a rod portion $63b$ for closing and opening the check valve 64. The valve member 63 is further formed with an axial passage $63c$ for permitting the flow of fluid under pressure passing therethrough from the conduit $P_8$ to the fluid chamber $R_2$.

When the pressure in chamber $R_1$ increases more than the pressure in chamber $R_2$ in braking operation, the piston 62 is moved rightward to close the passage $62a$ by engagement with the ball $63a$ of valve member 63, and in turn, the valve member 63 is moved rightward to open the check valve 64. As a result, the fluid under pressure from the conduit $P_8$ flows into the chamber $R_2$ through the check valve 64 and passage $63c$ to increase the pressure in chamber $R_2$. This causes the pressure in chamber $R_2$ to correspond with the pressure in chamber $R_1$. When the pressure in chamber $R_2$ increases more than the pressure in chamber $R_1$, the piston 62 is moved leftward to open the passage 62a, and in turn, the check valve 64 is closed to interrupt the flow of fluid under pressure into the chamber $R_2$ from conduit $P_8$. As a result, the fluid under pressure in chamber $R_2$ is discharged into the fluid reservoir 12A of master cylinder 12 through the passage 62a and return conduit $P_{10}$ to decrease the pressure in chamber $R_2$. This causes the pressure in chamber $R_2$ to correspond with the pressure in chamber $R_1$.

The hydraulic power pressure source 70 is in the form of a fluid pump 72 driven by an electric motor 71. The fluid pump 72 is connected at its inlet port to the fluid reservoir 12A of master cylinder 12 by way of return conduit $P_{10}$ and connected at its outlet port to the regulator valve 60 and an accumulator 74 by way of conduit $P_8$ and to the hydraulic brake booster 11 by way of conduit $P_7$. Disposed within the conduit $P_8$ is a check valve 73 which is arranged to permit the flow of fluid under pressure supplied from the pump 72 into the regulator valve 60, accumulator 74 and brake booster 11. In this embodiment, the accumulator 74 is provided thereon with a pressure sensor 74a which is arranged to produce an electric signal therefrom when the pressure in accumulator 74 drops below a predetermined value. The computer 50 is connected to the pressure sensor 74a and is programmed to produce a drive signal therefrom in response to the electric signal from the pressure sensor. The electric motor 71 is connected to the computer 50 to be energized in response to the drive signal from the computer 50 and to be deenergized in response to disappearance of the drive signal from the computer 50.

Assuming that the anti-skid apparatus is inoperative, the switchover valves 37 and 38 are deenergized to permit the flow of fluid under pressure supplied from the master cylinder 12 to the switchover valves 31, 33 and 35 therethrough, and the switchover valves 31, 33 and 35 are deenergized to permit the flow of fluid under pressure supplied therefrom to the wheel brake cylinders 21-24 through the flow control valves 32, 34 and 36. In such a condition, the hydraulic braking pressure of master cylinder 12 caused by depression of the brake pedal 10 is applied to the wheel brake cylinders 21-24 through the valves 31-38 to effect a normal braking operation of the vehicle. If the road wheels tend to be locked in the braking operation, the switchover valves 37 and 38 are energized in response to one of the control signals from the computer 50 interrupt the flow of fluid under pressure from the master cylinder 12 and connect the switchover valves 31, 33 and 35 to the regulator valve 60 through the conduit $P_6$. Simultaneously or thereafter, the switchover valves 31, 33 and 35 and flow control valves 32, 34 and 36 are intermittently energized in response to the other control signals from the computer 50 to connect the wheel brake cylinders 21-24 to the fluid reservoir 12A of master cylinder 12 and connect them to the regulator valve 60. Thus, each hydraulic pressure in the wheel brake cylinders 21-24 is intermittently decreased and increased under control of the valves 31-36 to prevent the road wheels from locking in the braking operation.

During the intermittent energization of valves 31-36, the switchover valves 37 and 38 are maintained in their energized condition to interrupt the flow of fluid under pressure from the master cylinder 12, while the wheel brake cylinders 21-24 are intermittently supplied with the fluid under pressure from the hydraulic power pressure source 70 under control of the regulator valve 60 without causing any fluctuation in operation of the master cylinder 12. This is useful to maintain the hydraulic fluid in the master cylinder 12 without causing any consumption thereof and to eliminate unpleasant shock on the brake pedal 10.

Figure 3:
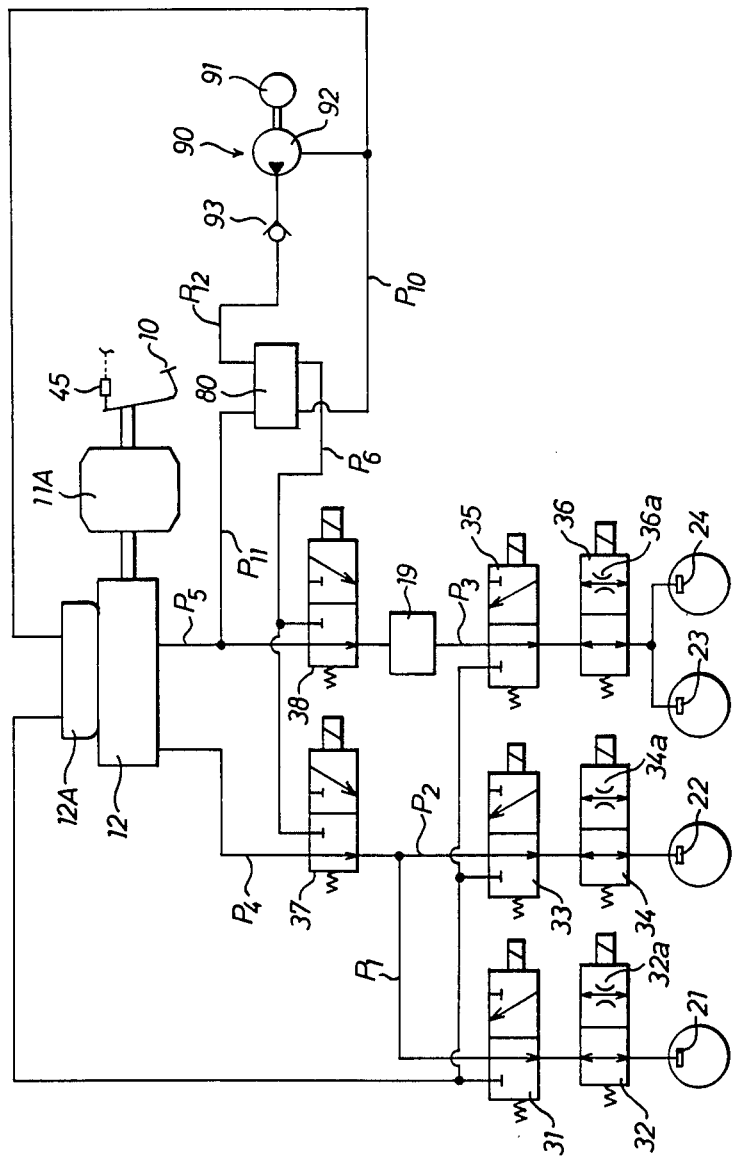
FIG. 3 is a schematic illustration of a modification of the anti-skid apparatus shown in FIG. 1.

In FIG. 3 there is illustrated a modification of the anti-skid apparatus described above, wherein the hydraulic brake booster 11 is replaced with a vacuum brake booster 11A, the regulator valve 60 is replaced with a regulator valve 80, and the hydraulic power pressure source 70 is replaced with a hydraulic power pressure source 90. In this modification, the regulator valve 80 is connected to the conduit $P_5$ by way of a conduit $P_{11}$ to be supplied with the fluid under pressure from the master cylinder 12 in braking operation. Thus, the regulator valve 80 acts to control a hydraulic power pressure applied thereto from the power pressure source 90 through a conduit $P_{12}$ in dependence upon the hydraulic pressure from the master cylinder 12 thereby to modulate the power pressure approximately to the same value as the master cylinder pressure.

Figure 4:
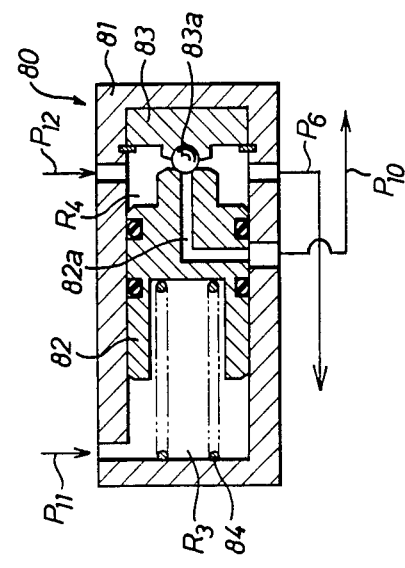
FIG. 4 is a sectional view of a regulator valve shown in FIG. 3.

As shown in FIG. 4, the regulator valve 80 includes a housing 81 formed with four ports for connection to the conduits $P_6$, $P_{10}$, $P_{11}$ and $P_{12}$ and being provided therein with a piston 82, a valve member 83 and a coil spring 84. The piston 82 is axially movably disposed within the housing 81 to subdivide the interior of housing 81 into fluid chambers $R_3$ and $R_4$ respectively connected to the conduits $P_{11}$ and $P_6$, $P_{12}$. The piston 82 is formed with a passage 82a for permitting the flow of fluid passing therethrough from the fluid chamber $R_4$ to the return conduit $P_{10}$. The valve member 83 is provided with a ball 83a fixed thereto for closing and opening the passage 82a of piston 82 and is secured in place within the housing 81. The coil spring 84 is arranged to bias the piston 82 toward the valve member 83 so as to close the passage 82a by engagement with the ball 83a.

When the pressure in chamber $R_4$ increases more than a sum of the pressure in chamber $R_3$ and the biasing force of spring 84 in braking operation, the piston 82 is moved leftward to open the passage 82a. As a result, the fluid under pressure in chamber $R_4$ is discharged into the fluid reservoir 12A of master cylinder 12 through the passage 82a and return conduit $P_{10}$ to decrease the pressure in chamber $R_4$. This causes the pressure in chamber $R_4$ to correspond with the pressure in chamber $R_3$. When the pressure in chamber $R_4$ is less than the sum of the pressure in chamber $R_3$ and the biasing force of spring 84, the passage 82a of piston 82 is closed by engagement with the ball 83a of valve member 83 and is maintained in the closed condition so that the fluid under pressure from the power pressure source 90 is supplied to the conduit $P_6$ without any modulation.

The hydraulic power pressure source 90 is in the form of a fluid pump 92 driven by an electric motor 91 which is connected to the computer 50 to be energized in response to a drive signal from the computer 50 and to be deenergized in response to disappearance of the drive signal. The fluid pump 92 is connected at its inlet port to the return conduit $P_{10}$ and at its outlet port to the regulator valve 80 by way of the conduit $P_{12}$. Disposed within the conduit $P_{12}$ is a check valve 93 which is arranged to permit the flow of fluid under pressure supplied from the pump 92 into the regulator valve 80.

In this modification, the fluid pump 92 is arranged to produce a hydraulic power pressure higher than a maximum pressure of the master cylinder 12 in braking operation.

Figure 5:
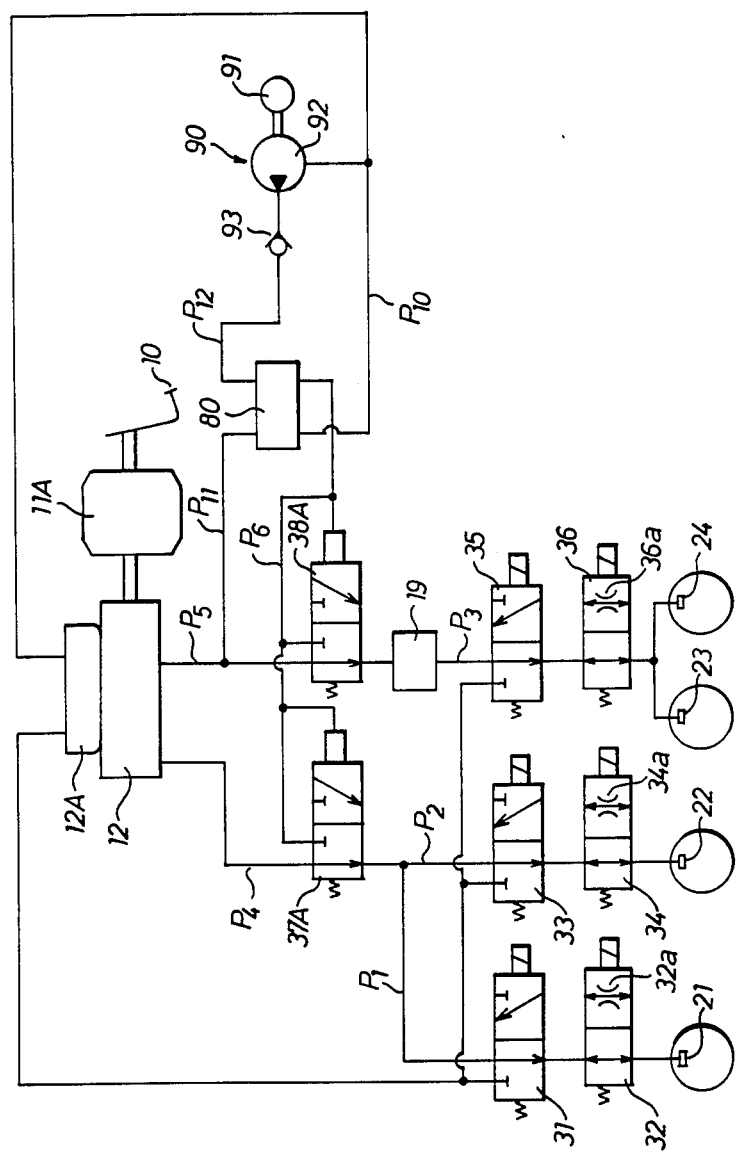
FIG. 5 is a schematic illustration of another modification of the anti-skid apparatus shown in FIG. 1.

In FIG. 5 there is illustrated another modification of the anti-skid apparatus shown in FIG. 1, wherein the electrically operated switchover valves 37 and 38 are replaced with hydraulically operated switchover valves 37A and 38A which are arranged to be operated prior to energization of the valves 31–36 when the modulated hydraulic power pressure from the regulator valve 80 has increased more than a predetermined value in braking operation. Other construction and arrangement of this modification are substantially the same as those in the modification of FIG. 3.

Figure 6:
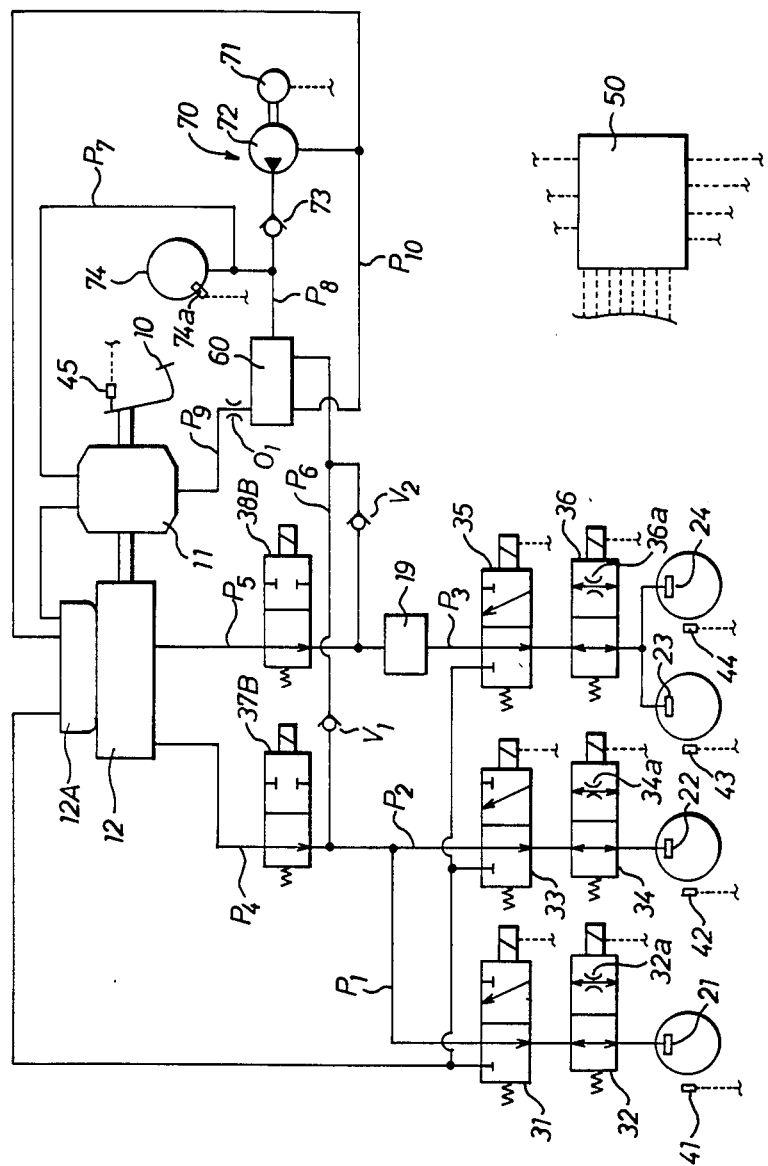
FIGS. 6 and 7 illustrate further modifications of the anti-skid apparatus shown in FIG. 1.

In FIG. 6 there is illustrated a further modification of the anti-skid apparatus shown in FIG. 1, wherein the switchover valves 37 and 38 are replaced with electrically operated cut-off valves 37B and 38B which are energized in response to the control signal from the computer 50 to interrupt the flow of fluid under pressure from the master cylinder 12 in braking operation and wherein the conduit $P_6$ is connected to the conduits $P_4$ and $P_5$ between the cut-off valves 37B, 38B and the switchover valves 31, 33, 35 to apply the modulated hydraulic power pressure from the regulator valve 60 to the switchover valves 31, 33, 35. Disposed within the conduit $P_6$ are check valves $V_1$ and $V_2$ which are arranged to interrupt the flow of fluid from the conduits $P_4$, $P_5$ to the regulator valve 60. When the flow of fluid under pressure from the master cylinder 12 is supplied to the wheel brake cylinders 21–24 through the deenergized valves 37B, 38B and 31–36 in braking operation, the master cylinder pressure in conduits $P_4$, $P_5$ becomes approximately the same value as the modulated hydraulic power pressure from the regulator valve 60. When the cut-off valves 37B and 38B are energized in response to the control signal from the computer 50 to interrupt the flow of fluid under pressure from the master cylinder 12, the switchover valves 31, 33 and 35 are applied with the modulated hydraulic power pressure from the regulator valve 60 through check valves $V_1$, $V_2$. Thus, each hydraulic pressure in the wheel brake cylinder 21–24 is intermittently decreased and increased under control of the valves 31–36 to prevent the road wheels from locking in the braking operation.

Figure 7:
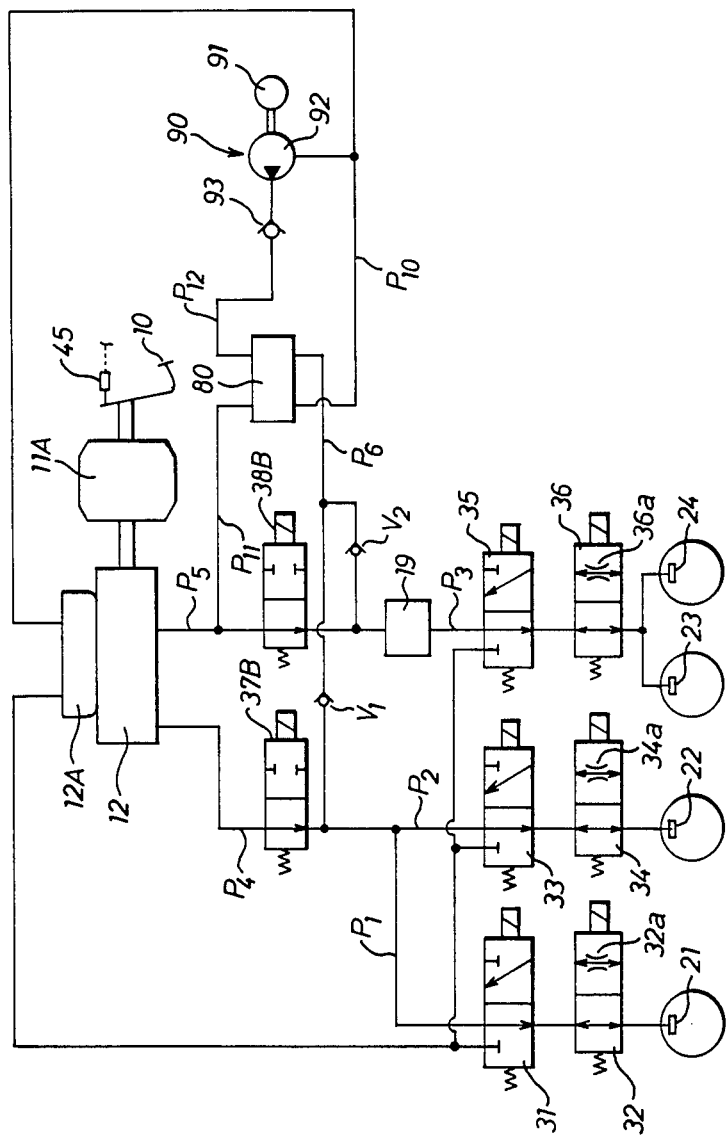

In FIG. 7 there is illustrated a modification of the anti-skid apparatus shown in FIG. 6, wherein similarly to the modification of FIG. 3, the regulator valve 60 is replaced with a regulator valve 80 which is connected to the conduit $P_5$ between the master cylinder 12 and the cut-off valve 38B by way of a conduit $P_{11}$ to be supplied with the fluid under pressure from the master cylinder 12 in braking operation and wherein similarly to the modification of FIG. 3, the hydraulic power pressue source 70 is replaced with a hydraulic power pressure source 90 which is in the form of a fluid pump 92 driven by an electric motor 91. In this modification, the regulator valve 80 acts to control a hydraulic power pressure applied thereto from the power pressure source 90 through a conduit $P_{12}$ in dependence upon the hydraulic braking pressure from the master cylinder 12 thereby to modulate the power pressure approximately to the same value as the master cylinder pressure.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scop of the appended claims, the invention may be practiced otherwise than as specifically set forth herein.

What is claimed is:

1. An anti-skid apparatus for installation in a vehicle braking system between a master cylinder and a wheel brake cylinder, comprising:

a fluid reservoir arranged to store an amount of hydraulic fluid;

a hydraulic power pressure source connected to said fluid reservoir and comprising means to produce a hydraulic power pressure at a predetermined level;

a regulator valve connected to said power pressure source and comprising means to control the hydraulic power pressure in response to a braking operation;

a first switchover valve disposed within a braking circuit connecting said master cylinder to said wheel brake cylinder, said first switchover valve comprising means for permitting a flow of fluid under pressure to be supplied therethrough from said master cylinder to said wheel brake cylinder when in a deactivated condition thereof and being arranged to be intermittently activated when a road wheel tends to be locked in braking operation, said first switchover valve being connected to said fluid reservoir to connect said wheel brake cylinder to said fluid reservoir when in an activated condition thereof;

a second switchover valve disposed within the braking circuit between said master cylinder and said first switchover valve, said second switchover valve comprising means for permitting a flow of fluid under pressure to be supplied therethrough from said master cylinder to said first switchover valve in a deactivated condition thereof and being arranged to be activated when the road wheel tends to be locked, said second switchover valve being connected to said regulator valve and having means to interrupt the flow of fluid under pressure from said master cylinder and permit the flow of fluid under controlled power pressure supplied therethrough from said regulator valve to said first switchover valve when in an activated condition thereof;

wherein said regulator valve is arranged independently of said master cylinder to modulate the hydraulic power pressure in dependence upon a hydraulic pressure created in said master cylinder in braking operation.

2. An anti-skid apparatus as claimed in claim 1, wherein said fluid reservoir is in the form of a fluid reservoir of said master cylinder;

3. An anti-skid apparatus as claimed in claim 1, wherein said master cylinder is equipped with a hydraulic brake booster connected to said power pressure source to be activated by depression of a brake pedal, and wherein said regulator valve is connected to said brake booster to modulate the hydraulic power pressure in dependence upon a hydraulic assist power of said brake booster applied to said master cylinder in braking operation.

4. An anti-skid apparatus as claimed in claim 1, wherein said regulator valve is connected to the braking circuit between said master cylinder and said second switchover valve to modulate the hydraulic power pressure in dependence upon a braking pressure applied to said wheel brake cylinder from said master cylinder in braking operation.

5. An anti-skid apparatus as claimed in claim 1, wherein said first and second switchover valves each are in the form of an electrically operated switchover valve which is arranged to be energized in response to an electric control signal from an electric control circuit when the road wheel tends to be locked in braking operation.

6. An anti-skid apparatus as claimed in claim 5, wherein said second switchover valve is arranged to be energized prior to energization of said first switchover valve.

7. An anti-skid apparatus as claimed in claim 1, wherein said first switchover valve is in the form of an electrically operated switchover valve which is arranged to be energized in response to an electric control signal from an electric control circuit when the road wheel tends to be locked, and wherein said second switchover valve is in the form of a hydraulically operated switchover valve which is arranged to be activated by a hydraulic pressure applied thereto from said regulator valve.

8. An anti-skid apparatus for installation in a vehicle braking system between a master cylinder and a wheel brake cylinder, comprising:
  a fluid reservoir arranged to store an amount of hydraulic fluid;
  a hydraulic power pressure source connected to said fluid reservoir and comprising means to produce a hydraulic power pressure at a predetermined level higher than a braking pressure applied to said wheel brake cylinder from said master cylinder;
  a regulator valve connected to said power pressure source and comprising means to control the hydraulic power pressure in response to a braking operation;
  a switchover valve disposed within a braking circuit connecting said master cylinder to said wheel brake cylinder, said switchover valve comprising means for permitting a flow of fluid under pressure to be supplied therethrough from said master cylinder to said wheel brake cylinder when in a deactivated condition thereof and being arranged to be intermittently activated when a road wheel tends to be locked in braking operation, said switchover valve being connected to said fluid reservoir to connect said wheel brake cylinder to said fluid reservoir when in an activated condition thereof; and
  a cut-off valve disposed within the braking circuit between said master cylinder and said switchover valve, said cut off valve comprising means for permitting a flow of fluid under pressure to be supplied therethrough from said master cylinder to said switchover valve when in a deactivated condition thereof and being arranged to be activated when the road wheel tends to be locked, said cut-off valve further comprising means to interrupt the flow of fluid under pressure from said master cylinder when in an activated condition thereof;
  wherein said regulator valve is arranged independently of said master cylinder to modulate the hydraulic power pressure in dependence upon a hydraulic pressure created in said master cylinder in a braking operation, and wherein a check valve is disposed within a fluid circuit connecting said regulator valve to the braking circuit between said cut-off valve and said switchover valve to permit the flow of fluid under modulated power pressure from said regulator valve to said switchover valve.

9. An anti-skid apparatus as claimed in claim 8, wherein said fluid reservoir is in the form of a fluid reservoir of said master cylinder, and said master cylinder is equipped with a hydraulic brake booster connected to said power pressure source so as to be activated by depression of a brake pedal, and wherein said regulator valve is connected to said brake booster to modulate the hydraulic power pressure in dependence upon a hydraulic assist power of said brake booster applied to said master cylinder in braking operation.

10. An anti-skid apparatus as claimed in claim 8, wherein said regulator valve is connected to the braking circuit between said master cylinder and said cut-off valve to modulate the hydraulic power pressure in dependence upon a braking pressure applied to said wheel brake cylinder from said master cylinder in braking operation.

11. An anti-skid apparatus as claimed in claim 8, wherein said switchover valve and said cut-off valve each are in the form of an electrically operated switchover valve which is arranged to be energized in response to an electric control signal from an electric control circuit when the road wheel tends to be locked in braking operation.

12. An anti-skid apparatus as claimed in claim 5, wherein said cut-off valve is arranged to be energized prior to energization of said switchover valve.

* * * * *

UNITED STATES PATENT AND TRADEMARK OFFICE
CERTIFICATE OF CORRECTION

PATENT NO. : 4,800,289

DATED : January 24, 1989

INVENTOR(S) : Yoshiharu ADACHI

It is certified that error appears in the above-identified patent and that said Letters Patent is hereby corrected as shown below:

Column 2, line 23, change "it is preferably" to --it is preferable--;

Column 4, line 1, change "P6" to --$P_6$--;

Column 5, line 1, change "in chamber R2." to --in chamber $R_2$.--;

line 52, change "from the computer 50 interrupt" to --from the computer 50 to interrupt--;

Column 6, line 33, change "$P_{11}$and $P_6$, $P_{12}$." to --$P_{11}$, $P_6$ and $P_{12}$.--;

Column 7, line 25, change "31, 33, 35" to --31, 33 and 35--;

line 27, change "31, 33, 35." to --31, 33 and 35.--;

UNITED STATES PATENT AND TRADEMARK OFFICE
CERTIFICATE OF CORRECTION

PATENT NO. : 4,800,289
DATED : January 24, 1989
INVENTOR(S) : Yoshiharu ADACHI

It is certified that error appears in the above-identified patent and that said Letters Patent is hereby corrected as shown below:

Column 7, line 30, change "$P_4$, $P_5$" to --$P_4$ and $P_5$--;

line 34, change "$P_4$, $P_5$" to --$P_4$ and $P_5$--;

line 42, change "$V_1$, $V_2$" to --$V_1$ and $V_2$--;

line 56, change "power pressue" to --power pressure--

Column 8, line 4, change "within the scop of" to --within the scope of--;

Column 10, line 5, change "cut off valve" to --cut-off valve--.

Signed and Sealed this

Ninth Day of January, 1990

*Attest:*

JEFFREY M. SAMUELS

*Attesting Officer*    *Acting Commissioner of Patents and Trademarks*

UNITED STATES PATENT AND TRADEMARK OFFICE
CERTIFICATE OF CORRECTION

PATENT NO. : 4,800,289
DATED : JANUARY 24, 1989
INVENTOR(S) : YOSHIHARU ADACHI ET AL.

It is certified that error appears in the above-identified patent and that said Letters Patent is hereby corrected as shown below:

Priority Data is missing from the patent. Please insert --Priority dates January 18, 1986 and December 22, 1986 filed in Japan and bears the Serial Numbers 61-8403 and 61-306026--;

On the title page, delete "5 Drawing Sheets" and insert --6 Drawing Sheets--.

Signed and Sealed this

Third Day of September, 1991

Attest:

HARRY F. MANBECK, JR.

*Attesting Officer*      *Commissioner of Patents and Trademarks*